(12) United States Patent
Moravec et al.

(10) Patent No.: US 10,082,114 B2
(45) Date of Patent: Sep. 25, 2018

(54) EXHAUST GAS RECIRCULATION SYSTEM

(71) Applicant: Progress Rail Locomotive Inc., LaGrange, IL (US)

(72) Inventors: Keith E. Moravec, Downers Grove, IL (US); Sudarshan K. Loya, Naperville, IL (US); Michael B. Goetzke, Orland Park, IL (US); Reddy Pocha Siva Sankara, Lisle, IL (US); Steven D. Johnson, Naperville, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 113 days.

(21) Appl. No.: 15/042,535

(22) Filed: Feb. 12, 2016

(65) Prior Publication Data

US 2017/0234272 A1 Aug. 17, 2017

(51) Int. Cl.
*F02M 26/35* (2016.01)
*F02D 41/00* (2006.01)
*F02M 26/15* (2016.01)
*F02M 26/22* (2016.01)
*F02M 26/00* (2016.01)

(52) U.S. Cl.
CPC ......... *F02M 26/35* (2016.02); *F02D 41/0065* (2013.01); *F02M 26/15* (2016.02); *F02M 26/22* (2016.02); *F02M 2026/001* (2016.02)

(58) Field of Classification Search
CPC ........ F02M 26/35; F02M 26/15; F02M 26/22; F02M 2026/001; F02M 26/25; F02M 26/24; F02M 26/44; F02M 26/23; F02M 26/26; F02M 26/33; F02M 26/38; F02M 26/30; F02M 26/05; F02M 26/06; F02M 26/14–26/16; F02D 41/0065; F02D 41/0077; F02D 9/04; F02B 29/0406; F02B 29/04; F02B 29/0418; F02B 37/183; Y02T 10/47; Y02T 10/26; Y02T 10/20
USPC .......................................... 123/568
See application file for complete search history.

(56) References Cited

U.S. PATENT DOCUMENTS 7,299,793 B1 11/2007 Tyo et al.
2008/0295501 A1 12/2008 Gong et al.
(Continued)

FOREIGN PATENT DOCUMENTS

CN 204126771 1/2015
CN 104653353 5/2015
(Continued)

OTHER PUBLICATIONS

CN 104653353 A-Tan et al.-English Translation.*

*Primary Examiner* — Joseph Dallo
*Assistant Examiner* — Scott A Reinbold (57) ABSTRACT

An Exhaust Gas Recirculation (EGR) system for an engine system is provided. The EGR system includes an exhaust gas treatment module positioned upstream of an EGR cooler with respect to an exhaust gas flow direction. The exhaust gas treatment module is in selective fluid communication with an exhaust gas line of an engine. The EGR system also includes a bypass line in selective fluid communication with the exhaust gas line of the engine. The EGR system further includes a valve arrangement configured to route an exhaust gas flow through at least one of the exhaust gas treatment module and the bypass line.

17 Claims, 4 Drawing Sheets

(56) References Cited

U.S. PATENT DOCUMENTS

| | | | | |
|---|---|---|---|---|
| 2009/0013978 A1* | 1/2009 | Joergl | ............... | F02B 29/0418 123/568.12 |
| 2010/0293922 A1* | 11/2010 | Delavan | ............. | F02D 41/0065 60/273 |
| 2014/0033705 A1 | 2/2014 | Blythe et al. | | |

FOREIGN PATENT DOCUMENTS

| | | | |
|---|---|---|---|
| CN | 104653353 A | * | 5/2015 |
| JP | 07238870 | | 9/1995 |
| WO | 2010123409 | | 10/2010 |

* cited by examiner

EXHAUST GAS RECIRCULATION SYSTEM

TECHNICAL FIELD

The present disclosure relates to an Exhaust Gas Recirculation (EGR) system, and more particularly to an EGR system for an air intake system of an engine system.

BACKGROUND

Engine systems generally include an Exhaust Gas Recirculation (EGR) system associated therewith. The EGR system is configured to reduce NOx generation and increase efficiency of the engine system by recirculating a part of the exhaust gases to an air intake system of an engine. The recirculated exhaust gases are generally introduced into an intake plenum of the air intake system and are mixed with non-combusted intake air therewithin.

An EGR cooler is associated with the EGR system for cooling the recirculated exhaust gases. The EGR coolers have a common problem of fouling i.e. deposition of hydrocarbon (HC), soot, etc. on a gas side of the EGR cooler. The depositions result in loss of heat transfer capability as the depositions are highly non-conductive, thereby reducing efficiency of the EGR cooler. Further, the loss in heat transfer capability increases harmful emissions like NOx in the exhaust gases. The depositions also increase pressure drop across a flow of the recirculated exhaust gases through the EGR system. The increase in pressure drop in turn increases the back pressure on the engine, thereby increasing fuel consumption and particulate matter emissions.

U.S. Pat. No. 7,299,793 describes a compression ignition engine having an EGR loop that contains a metallic DOC for treating recirculated exhaust gas obtained directly from cylinder exhaust through an exhaust manifold before the exhaust gas passes through a cooler, and an EGR valve to an intake system.

SUMMARY OF THE DISCLOSURE

In one aspect of the present disclosure, an Exhaust Gas Recirculation (EGR) system for an engine system is provided. The EGR system includes an exhaust gas treatment module positioned upstream of an EGR cooler with respect to an exhaust gas flow direction. The exhaust gas treatment module is in selective fluid communication with an exhaust gas line of an engine. The EGR system also includes a bypass line in selective fluid communication with the exhaust gas line of the engine. The EGR system further includes a valve arrangement configured to route an exhaust gas flow through at least one of the exhaust gas treatment module and the bypass line.

In another aspect of the present disclosure, an engine system is provided. The engine system includes an engine. The engine system also includes an exhaust gas line in fluid communication with the engine. The exhaust gas line is configured to receive an exhaust gas flow from the engine. The engine system further includes an air intake system in fluid communication with the exhaust gas line. The air intake system includes an EGR system. The EGR system includes an exhaust gas treatment module positioned upstream of an EGR cooler with respect to an exhaust gas flow direction. The exhaust gas treatment module is in selective fluid communication with an exhaust gas line of an engine. The EGR system also includes a bypass line in selective fluid communication with the exhaust gas line of the engine. The EGR system further includes a valve arrangement configured to route an exhaust gas flow through at least one of the exhaust gas treatment module and the bypass line.

In yet another aspect of the present disclosure, a method for recirculating an exhaust gas flow is provided. The method includes positioning an exhaust gas treatment module upstream of an EGR cooler with respect to an exhaust gas flow direction. The exhaust gas treatment module is in selective fluid communication with an exhaust gas line of the engine. The method also includes positioning a bypass line in selective fluid communication with the exhaust gas line of the engine. The method further includes routing the exhaust gas flow through at least one of the exhaust gas treatment module and the bypass line.

Other features and aspects of this disclosure will be apparent from the following description and the accompanying drawings.

DETAILED DESCRIPTION

Figure 1:
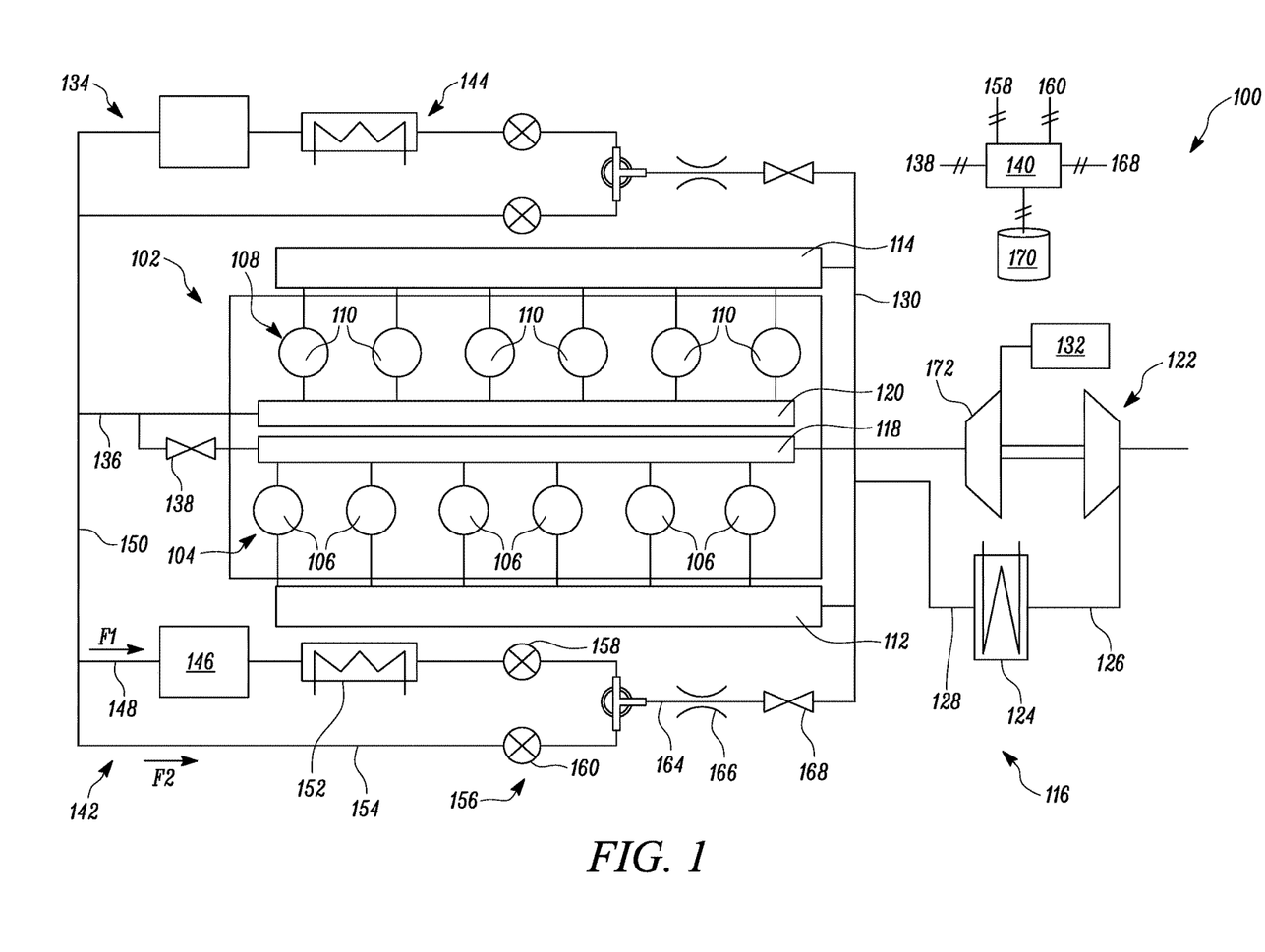
FIG. 1 is a schematic view of an exemplary engine system having an Exhaust Gas Recirculation (EGR) system, according to one embodiment of the present disclosure.

Wherever possible, the same reference numbers will be used throughout the drawings to refer to the same or the like parts. FIG. 1 illustrates an exemplary engine system 100, according to one embodiment of the present disclosure. The engine system 100 includes an engine 102. In one embodiment, the engine 102 may include, for example, a diesel engine, a gasoline engine, a gaseous fuel powered engine such as, a natural gas engine, or any other type of internal combustion engine apparent to one of skill in the art.

The engine 102 includes a first group of cylinders 104 having individual cylinders 106. Further, the engine 102 also includes a second group of cylinders 108 having individual cylinders 110. The engine 102 further includes intake manifolds 112, 114 associated with each of the first and second group of cylinders 104, 108. The intake manifolds 112, 114 receive intake air, which may include recirculated exhaust gases therein, through an air intake system 116. The engine 102 also includes exhaust manifolds 118, 120 associated with each of the first and second group of cylinders 104, 108. Products of combustion may be exhausted from the first and second group of cylinders 104, 108 via the exhaust manifold 118, 120, respectively.

Ambient air may be drawn into the engine 102 through an air filter (not shown) of the air intake system 116. The air intake system 116 of the engine system 100 includes a turbocharger 122. The intake air is introduced in the turbocharger 122 for compression purposes, leading to a higher pressure thereof. The compressed intake air may then flow towards an aftercooler 124, via a line 126. The aftercooler 124 is configured to decrease a temperature of the intake air flowing therethrough. In one example, the aftercooler 124 may be embodied as an air to air aftercooler. Alternatively, the aftercooler 124 may embody an air to liquid aftercooler.

The intake air may then enter an intake air line 128 and further flow towards an intake plenum 130 of the air intake system 116, before being introduced into each of the intake manifolds 112, 114. The intake plenum 130 may fluidly couple the intake manifolds 112, 114 and the intake air line 128.

The engine system 100 also includes an exhaust system 132. In the illustrated embodiment, the exhaust system 132 is provided in fluid communication with the exhaust manifold 118. Alternatively, the exhaust system 132 may be provided in fluid communication with the exhaust manifold 120, or with both the exhaust manifolds 118, 120. One of ordinary skill in the art will appreciate that when combustion temperatures may exceed approximately 1372° C., atmospheric nitrogen may react with oxygen, forming various oxides of nitrogen (NOx). The exhaust system 132 may include exhaust gas treatment devices, elements, and components, for example, a Diesel Oxidation Catalyst (DOC), a Diesel Particulate Filter (DPF), hydrocarbon (HC) trap, a Selective Catalytic Reduction (SCR) SCR catalyst, etc., without limiting the scope of the present disclosure.

Further, in order to reduce the formation of NOx, an exhaust gas recirculation (EGR) process may be used to keep the combustion temperature below a NOx threshold. Therefore, a portion of the exhaust gas flow exiting the engine 102 is recirculated to the intake manifolds 112, 114 of the engine 102. The present disclosure relates to an EGR system 134 associated with the engine system 100. The EGR system 134 recirculates a portion of the exhaust gas flow to each of the intake manifolds 112, 114. In the illustrated example, the EGR system 134 is in fluid communication with the exhaust manifold 120 of the second group of cylinders 108, via an exhaust gas line 136. More particularly, the exhaust manifold 120 of the second group of cylinders 108 is fluidly coupled to the engine 102 such that the portion of the exhaust gases generated by the second group of cylinders 108 are recirculated to the engine 102. In one example, the second group of cylinders 108 may be referred to as donor group of cylinders. Whereas, the first group of cylinders 104 are referred to as non-donor group of cylinders. In the present example, the exhaust gases exiting the first group of cylinders 104 drive a turbine 172 of the turbocharger 122. In alternate examples, the first group of cylinders 104 may be embodied as the donor group of cylinders, or both the first and second group of cylinders 104, 108 may be embodied as the donor group of cylinders.

The exhaust gas line 136 receives the exhaust gas flow from the exhaust manifold 120. As shown in the accompanying figures, the EGR system 134 includes an Exhaust Restriction Valve (ERV) 138. The ERV 138 is provided on the exhaust gas line 136, and selectively couples the exhaust gas line 136 with the exhaust manifold 118. The ERV 138 selectively controls a flow rate of the exhaust gases flowing towards the EGR system 134. The ERV 138 introduces an excess amount of the exhaust gases from the exhaust gas line 136 to the exhaust manifold 118. The ERV 138 may typically be vacuum operated or pressure operated or electrically operated, but may also be controlled by a control module 140 associated with the engine system 100.

The exhaust gases flowing through the exhaust gas line 136 split to flow through a first EGR sub-system 142 and a second EGR sub-system 144. The first EGR sub-system 142 recirculates the exhaust gases to the intake manifold 112, whereas the second EGR sub-system 144 recirculates the exhaust gases to the intake manifold 114. For simplicity purposes, the first EGR sub-system 142 will now be explained in detail with reference to the accompanying figures. However, it should be noted that the description provided below is equally applicable to the second EGR sub-system 144, without limiting the scope of the present disclosure.

The first EGR sub-system 142 includes an exhaust gas treatment module 146. The exhaust gas treatment module 146 is provided on a main line 148.

The main line 148 and the exhaust gas treatment module 146 are in selective fluid communication with the exhaust gas line 136 of the engine 102, via a line 150. In one example, the main line 148 is in fluid communication with the exhaust gas line 136 when a temperature of the exhaust gas flow exiting the exhaust manifold 120 is above a predetermined threshold. In another example, the main line 148 is in fluid communication with the exhaust gas line 136 when a flow velocity of the exhaust gas flow is above a predetermined threshold. The temperature and the flow velocity of the exhaust gas flow exiting the exhaust manifold 120 may be detected using sensors (not shown) associated with the engine system 100. Further, the predetermined thresholds corresponding to the temperature and the flow velocity is stored in a database 170 that is communicably coupled to the control module 140.

In one example, the exhaust gas treatment module 146 includes a DOC. In another example, the exhaust gas treatment module 146 includes a DPF. In yet another example, the exhaust gas treatment module 146 includes a combination of the DOC and the DPF. The exhaust gas treatment module 146 may include any type of arrangement that reduces concentration of HC in the exhaust gases flowing therethrough.

The first EGR sub-system 142 also includes an EGR cooler 152. The exhaust gas treatment module 146 is disposed upstream of the EGR cooler 152, with respect to a flow direction "F1" of the exhaust gases flowing through the main line 148. The EGR cooler 152 cools the high temperature exhaust gases leaving the engine 102, by heat exchange with a coolant. A person of ordinary skill in the art will appreciate that the EGR cooler 152 may include any air/coolant heat exchanger known to a person of ordinary skill in the art.

In one example, the first EGR sub-system 142 further includes a bypass line 154. The exhaust gases flow through the bypass line 154 along a flow direction "F2". The bypass line 154 of the first EGR sub-system 142 is in selective fluid communication with the exhaust gas line 136, via the line 150. In one example, the bypass line 154 is in fluid communication with the exhaust gas line 136 when the temperature of the exhaust gas flow exiting the exhaust manifold 120 is below the predetermined threshold. Further, the bypass line 154 is in fluid communication with the exhaust gas line 136 when the flow velocity of the exhaust gas flow is below the predetermined threshold. The bypass line 154 may be coated with ceramic or Teflon coating that allows reduction in fouling of the bypass line 154. Further, the bypass line 154 may include fins to provide effective heat transfer between the recirculated exhaust gas and the environment to reduce the recirculated exhaust gas temperature.

In another embodiment, the bypass line 154 may form a part of the EGR cooler 152, without limiting the scope of the present disclosure. Alternatively, the bypass line 154 may be in communication with an inlet port (not shown) of the EGR cooler 152. In yet another embodiment, the exhaust gas treatment module 146, the EGR cooler 152, and the bypass line 154 may be combined to form a single package or unit, without limiting the scope of the present disclosure.

According to an embodiment of the present disclosure, the first EGR sub-system 142 includes a valve arrangement 156. The valve arrangement 156 routes the exhaust gas flow through the exhaust gas treatment module 146 disposed on the main line 148 or the bypass line 154, based on the temperature of the exhaust gas flow and/or the flow velocity of the exhaust gas flow. The valve arrangement 156 is communicably coupled to the control module 140 and is configured to receive signals therefrom.

The valve arrangement 156 includes a first valve 158. The first valve 158 is positioned along the main line 148. The first valve 158 is positioned downstream of the EGR cooler 152, with respect to the exhaust gas flow direction "F1". The first valve 158 routes the exhaust gas flow through the exhaust gas treatment module 146 and the EGR cooler 152 when the temperature and/or the flow velocity of the exhaust gas flow is above the corresponding predetermined threshold. In an open position, the first valve 158 effectuates fluid communication between the exhaust gas line 136 and the exhaust gas treatment module 146. The first valve 158 operates in the open position based on signals received from the control module 140. More particularly, the control module 140 sends signals to the first valve 158 to operate in the open position when the temperature and/or the flow velocity of the exhaust gas flow is above the corresponding predetermined threshold.

The valve arrangement 156 also includes a second valve 160. The second valve 160 is positioned in the bypass line 154. The second valve 160 routes the exhaust gas flow through the bypass line 154 when the temperature and/or the flow velocity of the exhaust gas flow are below the corresponding predetermined threshold. In an open position, the second valve 160 effectuates fluid communication between the exhaust gas line 136 and the bypass line 154. The second valve 160 operates in the open position based on signals received from the control module 140. More particularly, the control module 140 sends signals to the second valve 160 to operate in the open position when the temperature and/or the flow velocity of the exhaust gas flow are below the corresponding predetermined threshold.

The first EGR sub-system 142 further includes a three way passage that fluidly communicates the main line 148 with a line 164, when the first valve 158 is in the open position. Further, the three way passage fluidly communicates the bypass line 154 with the line 164, when the second valve 160 is in the open position. The line 164 is in fluid communication with the intake plenum 130 so that the exhaust gases received from the main line 148 or the bypass line 154 is introduced in the intake plenum 130. The exhaust gases may be mixed with the intake air flow from the line 126 while flowing towards the intake manifolds 112, 114 via the intake plenum 130. In another example, the three way passage may be replaced by an L-valve or a T-valve that selectively allows fluid communication between the main line 148 and the line 164, or the bypass line 154 and the line 164.

A venturi 166 and an EGR control valve 168 are disposed on the line 164. The EGR control valve 168 is disposed downstream of the venturi 166. The EGR control valve 168 controls a flow rate of the exhaust gases flowing through the line 164. The EGR control valve 168 may typically be vacuum operated or pressure operated or electrically operated, but may also be controlled by the control module 140 associated with the engine system 100. In alternate embodiments, the first EGR sub-system 142 may omit the EGR control valve 168. In such an embodiment, the valves 158, 160 may perform the function of the EGR control valve 168.

It should be further noted that the first EGR sub-system 142 may omit the venture 166, without limiting the scope of the present disclosure.

Figure 2:
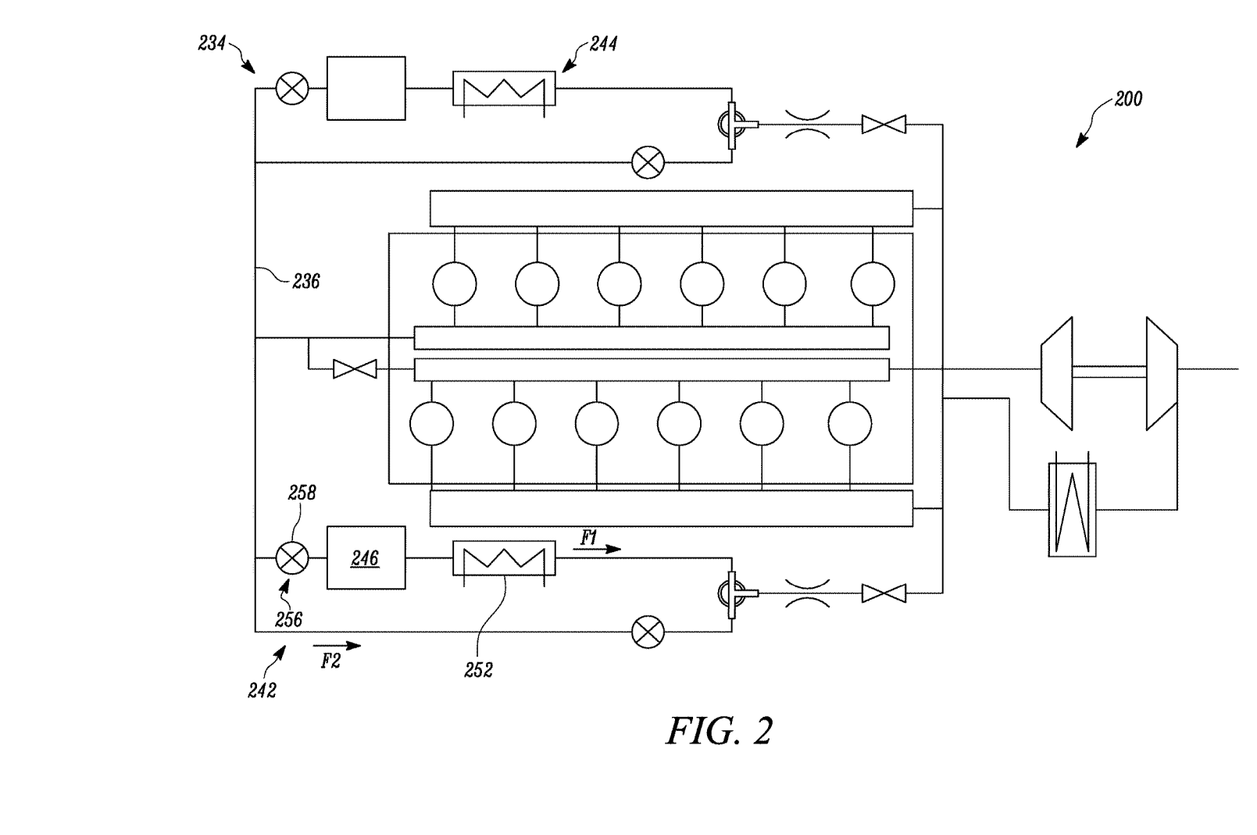
FIG. 2 is a schematic view of the engine system having the EGR system, according to another embodiment of the present disclosure.

FIG. 2 illustrates an EGR sub-system, according to another embodiment of the present disclosure. As illustrated, an engine system 200 includes an EGR system 234. The EGR system 234 includes a first EGR sub-system 242 and a second EGR sub-system 244. The embodiment will now be described herein with reference to the first EGR sub-system 242. However, it should be noted that the description provided below is equally applicable to the second EGR sub-system 244, without limiting the scope of the present disclosure.

The first EGR sub-system 242 includes a valve arrangement 256. A first valve 258 of the valve arrangement 256 is positioned upstream of an EGR cooler 252 with respect to the exhaust gas flow direction "F1". In the open position, the first valve 258 fluidly connects an exhaust gas treatment module 246 with an exhaust gas line 236. All other design details and arrangement of the engine system 200 are similar to the design details and arrangement of the engine system 100 shown in FIG. 1.

Figure 3:
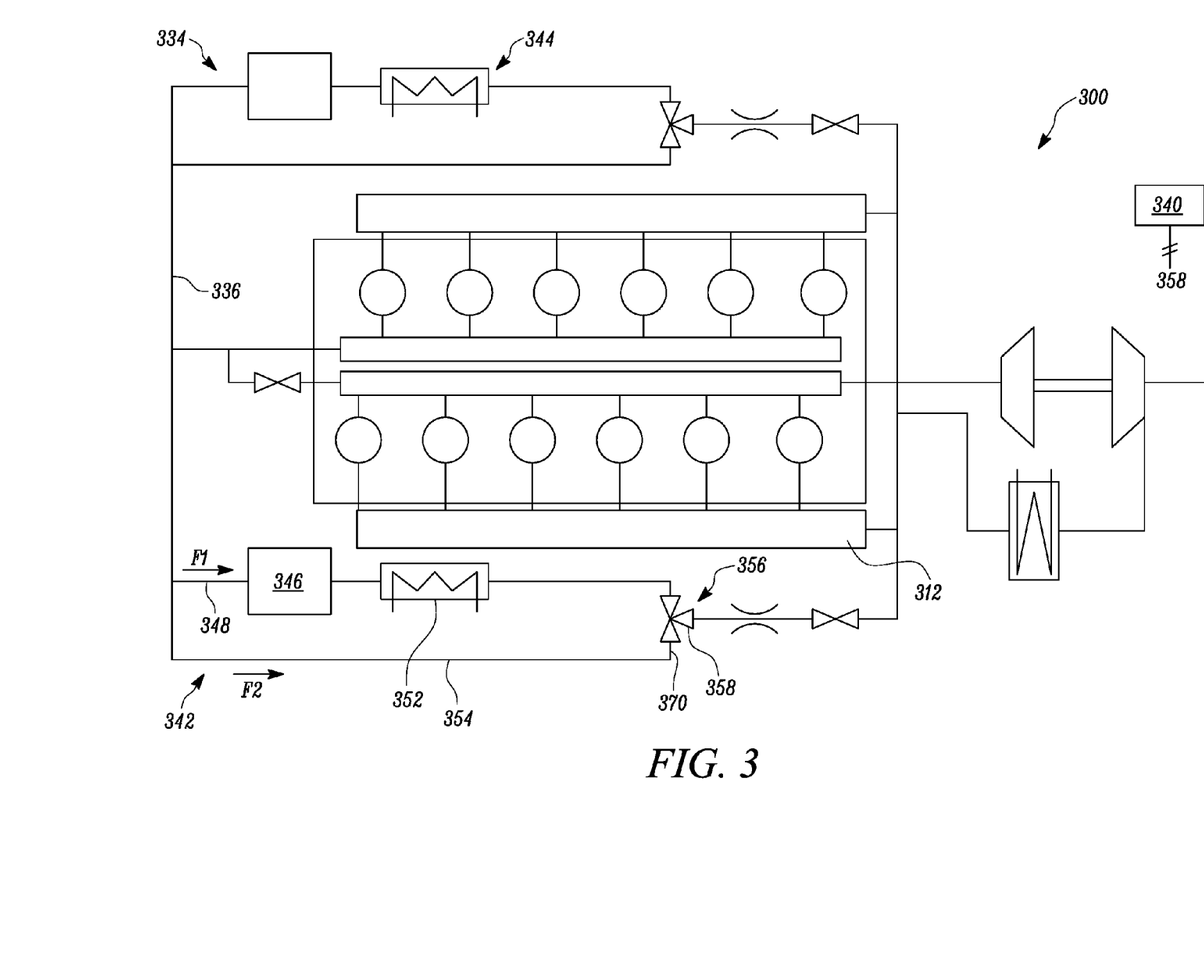
FIG. 3 is a schematic view of the engine system having the EGR system, according to yet another embodiment of the present disclosure.

FIG. 3 illustrates an EGR sub-system, according to yet another embodiment of the present disclosure. An EGR system 334 of an engine system 300 includes a first EGR sub-system 342 and a second EGR sub-system 344. The first and second EGR sub-systems 342, 344 are in fluid communication with the exhaust gas line 336. The embodiment will now be described herein with reference to the first EGR sub-system 342. However, it should be noted that the description provided below is equally applicable to the second EGR sub-system 344, without limiting the scope of the present disclosure.

The EGR system 334 includes a valve arrangement 356. The valve arrangement 356 includes a 3-way valve 358. The 3-way valve 358 is communicably coupled with a control module 340 and is adapted to receive signals therefrom. In one example, the 3-way valve 358 is embodied as an L-valve. In an alternate example, the 3-way valve 358 is embodied as a T-valve. The 3-way valve 358 is positioned in a line 370 that is in selective fluid communication with a main line 348 and a bypass line 354. The 3-way valve 358 operates in a first configuration and a second configuration. The 3-way valve 358 operates in the first configuration when the temperature and/or the flow velocity of the exhaust gas flow exiting the exhaust manifold 120 is above the corresponding predetermined threshold. In the first configuration, the 3-way valve 358 effects fluid communication between the exhaust gas treatment module 346 and the exhaust gas line 336. The exhaust gas flow received from the exhaust gas line 336 flows through the exhaust gas treatment module 346 and the EGR cooler 352, before being introduced in the intake manifold 312.

The 3-way valve 358 switches from the first configuration to the second configuration, based on signals received from the control module 340. The 3-way valve 358 operates in the second configuration when the temperature and/or the flow velocity of the exhaust gas flow exiting the exhaust manifold 120 is below the corresponding predetermined threshold. In the second configuration, the 3-way valve 358 effects fluid communication between the exhaust gas line 336 and the bypass line 354. The first EGR sub-system 342 disclosed herein does not include the three way passage as shown in FIGS. 1 and 2. All other design details and arrangement of the engine system 300 is similar to the design details and arrangement of the engine system 100 shown in FIG. 1.

The control module 140, 340 may be a microprocessor or other processor as known in the art. The control module 140, 340 may embody a single microprocessor or multiple microprocessors for receiving signals from components of the engine system 100, 200, 300. Numerous commercially available microprocessors may be configured to perform the functions of the control module 140, 340. A person of ordinary skill in the art will appreciate that the control module 140, 340 may additionally include other components and may also perform other functions not described herein.

INDUSTRIAL APPLICABILITY

The present disclosure is directed towards an arrangement of the EGR system 134, 234, 334 that reduces fouling of the EGR cooler 152, 252, 352. Also, as the EGR cooler fouling is decreased and the heat transfer capability is increased, a smaller size of the EGR cooler 152, 252, 352 can be effectively used.

It should be noted that the present disclosure is equally applicable to engine systems that include a single EGR cooler and bypass line and/or multiple EGR coolers and bypass lines. Further, it is also applicable to engine systems without the donor/non-donor cylinder concept. The present disclosure is further applicable to multiple EGR coolers in series or parallel along with the bypass line, without any limitations.

References will now be made to the first EGR sub-system 142; however the description provided below is equally applicable to the first EGR sub-system 242, 342 and the second EGR sub-systems 144, 244, 344. During cold start or low temperature, low flow conditions, the exhaust gas flow is introduced in the intake plenum 130 via the bypass line 154, thus reducing the fouling on the EGR cooler 152. In one example, the bypass line 154 is coated with ceramic or Teflon coating that reduces fouling of the bypass line 154. The bypass line 154 includes added fins for efficient heat transfer from the recirculated exhaust gas to the environment to reduce the recirculated exhaust gas temperature.

Based on temperature, and flow condition, the exhaust gas flow is directed through the exhaust gas treatment module 146. As the exhaust gas treatment module 146 reaches light-off temperature, it will reduce the HC and in turn reduce the EGR cooler fouling. Also, the exhaust gases are driven alternatively between the main line 148 and the bypass line 154 to regenerate the EGR cooler 152. Accordingly, when the bypass line 154 is active, the EGR cooler 152 will cool down. The thermal cycling of the EGR cooler 152 will support active regeneration and hence will further reduce fouling of the EGR cooler 152. Similarly, the bypass line 154 will be subjected to thermal cycling to promote active regeneration of the bypass line 154. Further, the EGR control valve 168 is disposed downstream of the exhaust gas treatment module 146, and thus the EGR control valves tend to have better working life, thus increasing reliability.

Figure 4:
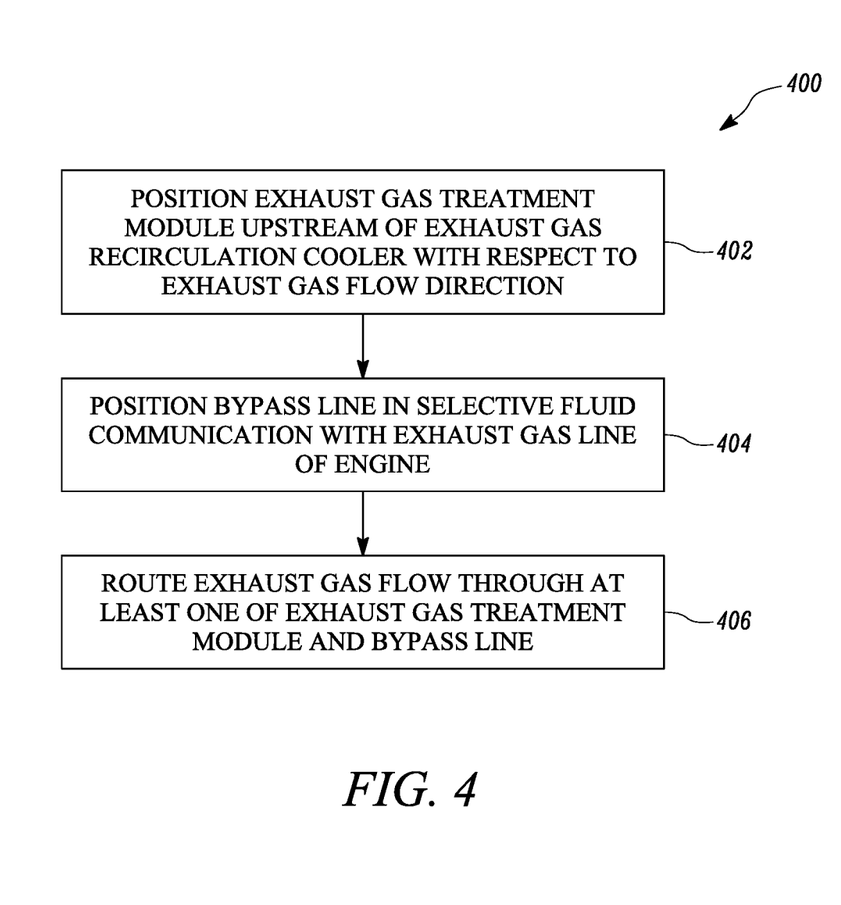
FIG. 4 is a flowchart for a method of recirculating an exhaust gas flow.

FIG. 4 is a flowchart for a method 400 of recirculating the exhaust gas flow. At step 402, the exhaust gas treatment module 146 is positioned upstream of the EGR cooler 152 with respect to the exhaust gas flow direction "F1". The exhaust gas treatment module 146 is in selective fluid communication with the exhaust gas line 136 of the engine 102. At step 404, the bypass line 154 is positioned in selective fluid communication with the exhaust gas line 136 of the engine 102.

At step 406, the exhaust gas flow is routed through at least one of the exhaust gas treatment module 146 and the bypass line 154. The exhaust gas flow is selectively routed through at least one of the exhaust gas treatment module 146 and the bypass line 154 using the valve arrangement 156. The control module 140 transmits signals to the valve arrangement 156 to effect fluid communication between the exhaust gas treatment module 146 and the exhaust gas line 136 when the temperature and/or the flow velocity of the exhaust gas flow is above the corresponding predetermined threshold. Further, the control module 140 transmits signals to the valve arrangement 156 to effect fluid communication between the bypass line 154 and the exhaust gas line 136 when the temperature and/or the flow velocity of the exhaust gas flow is below the corresponding predetermined threshold.

In one embodiment, the valve arrangement 156 includes the first valve 158 that selectively routes the exhaust gas flow through the exhaust gas treatment module 146 and the EGR cooler 152. The valve arrangement 156 also includes the second valve 160 that selectively routes the exhaust gas flow through the bypass line 154. In one example, the first valve 158 is positioned downstream of the EGR cooler 152 with respect to the exhaust gas flow direction "F1". In another example, the first valve 158 is positioned upstream of the exhaust gas treatment module 146 with respect to the exhaust gas flow direction "F1".

In another embodiment, the valve arrangement 356 includes the 3-way valve 358. In the first configuration, the 3-way valve 358 fluidly communicates the exhaust gas flow with the exhaust gas treatment module 346. In the second configuration, the 3-way valve 358 fluidly communicates the exhaust gas flow with the bypass line 354.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An Exhaust Gas Recirculation (EGR) system for an engine system, the EGR system comprising:
    a main line having an exhaust gas treatment module positioned upstream of an EGR cooler with respect to an exhaust gas flow direction, wherein the exhaust gas treatment module is in selective fluid communication with an exhaust gas line of an engine;
    a bypass line in selective fluid communication with the exhaust gas line of the engine; and
    a valve arrangement configured to alternatively route an exhaust gas flow through one of: (i) the main line having the exhaust gas treatment module and the EGR cooler, and (ii) the bypass line wherein the valve arrangement includes: a first valve configured to selectively route the exhaust gas flow through the exhaust gas treatment module and the EGR cooler; and a second valve configured to selectively route the exhaust gas flow through the bypass line.

2. The EGR system of claim 1, wherein the first valve is positioned downstream of the EGR cooler with respect to the exhaust gas flow direction.

3. The EGR system of claim 1, wherein the first valve is positioned upstream of the exhaust gas treatment module with respect to the exhaust gas flow direction.

4. The EGR system of claim 1, wherein the valve arrangement includes a 3-way valve, wherein:

a first configuration of the 3-way valve effects fluid communication between the exhaust gas treatment module and the exhaust gas line, and a second configuration of the 3-way valve effects fluid communication between the bypass line and the exhaust gas line.

5. The EGR system of claim 1 further comprising a control module, the control module configured to:
transmit a signal to the valve arrangement to effect fluid communication between the exhaust gas treatment module and the exhaust gas line when a temperature of the exhaust gas flow is above a predetermined threshold; and
transmit a signal to the valve arrangement to effect fluid communication between the bypass line and the exhaust gas line when the temperature of the exhaust gas flow is below the predetermined threshold.

6. The EGR system of claim 1, wherein the exhaust gas treatment module includes at least one of a Diesel Oxidation Catalyst and a Diesel Particulate Filter.

7. An engine system comprising:
an engine;
an exhaust gas line in fluid communication with the engine, the exhaust gas line configured to receive an exhaust gas flow from the engine; and
an air intake system in fluid communication with the exhaust gas line, the air intake system comprising:
an Exhaust Gas Recirculation (EGR) system comprising:
a main line having an exhaust gas treatment module positioned upstream of an EGR cooler with respect to an exhaust gas flow direction, wherein the exhaust gas treatment module is in selective fluid communication with an exhaust gas line of the engine;
a bypass line in selective fluid communication with the exhaust gas line of the engine; and
a valve arrangement configured to alternatively route the exhaust gas flow through one of: (i) the main line having the exhaust gas treatment module and the EGR cooler, and (ii) the bypass line wherein the valve arrangement includes: a first valve configured to selectively route the exhaust gas flow through the exhaust gas treatment module and the EGR cooler; and a second valve configured to selectively route the exhaust gas flow through the bypass line.

8. The engine system of claim 7, wherein the first valve is positioned downstream of the EGR cooler with respect to the exhaust gas flow direction.

9. The engine system of claim 7, wherein the first valve is positioned upstream of the exhaust gas treatment module with respect to the exhaust gas flow direction.

10. The engine system of claim 7, wherein the valve arrangement includes a 3-way valve, wherein:
a first configuration of the 3-way valve effects fluid communication between the exhaust gas treatment module and the exhaust gas line, and
a second configuration of the 3-way valve effects fluid communication between the bypass line and the exhaust gas line.

11. The engine system of claim 7 further comprising a control module, the control module configured to:

transmit a signal to the valve arrangement to effect fluid communication between the exhaust gas treatment module and the exhaust gas line when a temperature of the exhaust gas flow is above a predetermined threshold; and
transmit a signal to the valve arrangement to effect fluid communication between the bypass line and the exhaust gas line when the temperature of the exhaust gas flow is below the predetermined threshold.

12. The engine system of claim 7, wherein the exhaust gas treatment module includes at least one of a Diesel Oxidation Catalyst and a Diesel Particulate Filter.

13. A method for recirculating an exhaust gas flow, the method comprising:
positioning a main line having an exhaust gas treatment module upstream of an Exhaust Gas Recirculation (EGR) cooler with respect to an exhaust gas flow direction, wherein the exhaust gas treatment module is in selective fluid communication with an exhaust gas line of the engine;
positioning a bypass line in selective fluid communication with the exhaust gas line of the engine; and
alternatively routing the exhaust gas flow through one of: (i) the main line having the exhaust gas treatment module and the EGR cooler, and (ii) the bypass line selectively routing the exhaust gas flow through at least one of the exhaust gas treatment module and the bypass line using a valve arrangement, the valve arrangement comprising: a first valve configured to selectively route the exhaust gas flow through the exhaust gas treatment module and the EGR cooler; and a second valve configured to selectively route the exhaust gas flow through the bypass line.

14. The method of claim 13 further comprising:
positioning the first value downstream of the EGR cooler with respect to the exhaust gas flow direction.

15. The method of claim 13 further comprising:
positioning the first value upstream of the exhaust gas treatment module with respect to the exhaust gas flow direction.

16. The method of claim 13 further comprising:
fluidly communicating the exhaust gas flow with the exhaust gas treatment module using a 3-way valve in a first configuration, and
fluidly communicating the exhaust gas flow with the bypass line using the 3-way valve in a second configuration.

17. The method of claim 13 further comprising routing the exhaust gas flow by:
transmitting a signal to the valve arrangement to effect fluid communication between the exhaust gas treatment module and the exhaust gas line when a temperature of the exhaust gas flow is above a predetermined threshold; and
transmitting a signal to the valve arrangement to effect fluid communication between the bypass line and the exhaust gas line when the temperature of the exhaust gas flow is below the predetermined threshold.

* * * * *